United States Patent
Foley et al.

(10) Patent No.: US 9,244,632 B1
(45) Date of Patent: Jan. 26, 2016

(54) DATA STORAGE SYSTEM CONFIGURATION

(71) Applicant: EMC Corporation, Hopkinton, MA (US)

(72) Inventors: Robert P. Foley, Clinton, MA (US); Peter Puhov, Shrewsbury, MA (US); Marc C. Cassano, Medway, MA (US); Ronald D. Proulx, Boxborough, MA (US); Daniel E. Cummins, Hudson, NH (US)

(73) Assignee: EMC Corporation, Hopkinton, MA (US)

( * ) Notice: Subject to any disclaimer, the term of this patent is extended or adjusted under 35 U.S.C. 154(b) by 383 days.

(21) Appl. No.: 13/929,070

(22) Filed: Jun. 27, 2013

(51) Int. Cl.
*G06F 12/00* (2006.01)
*G06F 13/00* (2006.01)
*G06F 13/28* (2006.01)
*G06F 3/06* (2006.01)

(52) U.S. Cl.
CPC ............ *G06F 3/0689* (2013.01); *G06F 3/0614* (2013.01); *G06F 3/0638* (2013.01); *G06F 3/0653* (2013.01); *G06F 3/0683* (2013.01)

(58) Field of Classification Search
CPC ... G06F 3/0689; G06F 3/0614; G06F 3/0638; G06F 3/0683; G06F 3/0644; G06F 3/0653
USPC .......... 711/111, 114, 115, 116; 713/1, 2, 100; 710/38
See application file for complete search history.

(56) References Cited

U.S. PATENT DOCUMENTS 8,250,257 B1 8/2012 Harel et al.
8,375,385 B1 2/2013 Harel et al.

OTHER PUBLICATIONS

U.S. Appl. No. 13/737,295, filed Jan. 9, 2013, Harel, et al.
U.S. Appl. No. 13/923,427, filed Jun. 21, 2013, Foley, et al.

*Primary Examiner* — Yong Choe
*Assistant Examiner* — Shane Woolwine
(74) *Attorney, Agent, or Firm* — Muirhead and Saturnelli, LLC

(57) ABSTRACT

Described are techniques for booting a data storage system. A first set of configuration and state information is read from first storage devices of a first RAID group using special processing code and a RAID library. A first set of system objects (of a system object topology) are instantiated using the first set of information. The first set of system objects represent storage entities containing a second set of configuration and state information. Using an I/O runtime stack based on the system object topology, the second set of information is read from second storage devices of a second RAID group using the same RAID library having calls made from method(s) of a RAID group object representing the second RAID group. A second set of client objects, instantiated using the second set of information, represent storage entities including client data stored on third storage devices of a third RAID group.

20 Claims, 10 Drawing Sheets

DATA STORAGE SYSTEM CONFIGURATION

BACKGROUND

1. Technical Field

This application generally relates to techniques for use in data storage system configuration.

2. Description of Related Art

Computer systems may include different resources used by one or more host processors. Resources and host processors in a computer system may be interconnected by one or more communication connections. These resources may include, for example, data storage systems such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage system containing a plurality of host interface units, disk drives, and disk interface units. Such storage systems are provided, for example, by EMC Corporation of Hopkinton, Mass. The host systems access the storage system through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units, logical devices, or logical volumes (LVs). The logical disk units may or may not correspond to the actual disk drives. Allowing multiple host systems to access the storage system allows the host systems to share data stored therein.

SUMMARY OF THE INVENTION

In accordance with one aspect of the invention is a method of booting a data storage system comprising: reading a first set of configuration and state information from a first set of one or more storage devices, said first set of one or more storage devices being included in a first RAID group, wherein said reading the first set of configuration and state information includes performing a first set of one or more calls to a first code portion with a first set of one or more parameters including information describing the first RAID group and a first target location of the first set of configuration and state information; instantiating a first set of system objects using the first set of configuration and state information, the first set of system objects representing physical and logical storage entities including a second set of configuration and state information whereby the first set of system objects are included a system object topology; reading, using an I/O runtime stack based on the system object topology, the second set of configuration and state information from a second set of one or more storage devices included in a second RAID group, wherein said reading the second set of configuration and state information includes performing a second set of one or more calls to the first code portion with a second set of one or more parameters including information describing the second RAID group and a second target location of the second set of configuration and state information; and instantiating a second set of client objects using the second set of configuration and state information, the second set of client objects representing physical and logical entities including client data stored on a third set of one or more storage devices included in a third RAID group, wherein the second set of client objects are included a client object topology. Reading the first set of configuration and state information may be performed using a second code portion that issues the first set of one or more calls to the first code portion, wherein the second code portion may create and initialize a first structure included as a first parameter of the first set of parameters. The first structure may describe a RAID geometry of the first RAID group. The first structure may include a list identifying the first set of one or more storage devices as being included in the first RAID group, and a RAID protection level of the first RAID group. The second code portion may create and initialize a second structure included as a second parameter of the first set of parameters. The second structure may describe a first read operation to read the first set of configuration and state information from the first RAID group. The second structure may include information that identifies an I/O operation type of read and identifies the first target location. Reading the second set of configuration and state information may include a method of a RAID group object in the system object topology performing the second set of one or more calls to the first code portion, wherein the RAID group object may represent the second RAID group in the system object topology. The RAID group object may include a set of attributes describing the second RAID group, wherein the second set of parameters may be specified using the set of attributes from the RAID group object, and wherein a method of the RAID group object may receive as one or more input parameters a read I/O operation request to read the second set of configuration and state information at the second target location. The read I/O operation request may be received from one or more higher level objects in an object hierarchy including the RAID group object. The second set of parameters may include a first structure describing a RAID geometry of the second RAID group. The first structure may include a list identifying the second set of one or more storage devices as being included in the second RAID group, and a RAID protection level of the second RAID group. The method may include receiving a first I/O operation from a client; and processing the first I/O operation using an I/O runtime stack based on the client object topology, wherein said processing the first I/O operation includes performing a third set of one or more calls to the first code portion with a third set of one or more parameters including information describing the third RAID group and a third target location identifying a location from which data is read or a location to which data is written in accordance with the first I/O operation. Processing the first I/O operation may include a method of a RAID group object in the client object topology performing the third set of one or more calls to the first code portion, wherein the RAID group object may represent the third RAID group in the client object topology. The RAID group object may include a set of attributes describing the third RAID group, wherein the third set of parameters may be specified using the set of attributes from the RAID group object, and wherein a method of the RAID group object may receive as one or more input parameters an I/O operation request for the third I/O operation. The input parameters may identify a type of the I/O operation request as a read or a write operation and may also identify the location from which data is read or to which data is written in accordance with the type. The I/O operation request may be received from one or more higher level objects in an object hierarchy including the RAID group object. The third set of parameters may include a first structure describing a RAID geometry of the third RAID group. The first structure may include a list identifying the third set of one or more storage devices as being included in the third RAID group, and a RAID protection level of the third RAID group.

In accordance with another aspect of the invention is a computer readable medium comprising code stored thereon for booting a data storage system, the computer readable medium comprising code for: reading a first set of configuration and state information from a first set of one or more storage devices, said first set of one or more storage devices being included in a first RAID group, wherein said reading the first set of configuration and state information includes performing a first set of one or more calls to a first code portion with a first set of one or more parameters including information describing the first RAID group and a first target location of the first set of configuration and state information; instantiating a first set of system objects using the first set of configuration and state information, the first set of system objects representing physical and logical storage entities including a second set of configuration and state information whereby the first set of system objects are included in a system object topology; reading, using an I/O runtime stack based on the system object topology, the second set of configuration and state information from a second set of one or more storage devices included in a second RAID group, wherein said reading the second set of configuration and state information includes performing a second set of one or more calls to the first code portion with a second set of one or more parameters including information describing the second RAID group and a second target location of the second set of configuration and state information; and instantiating a second set of client objects using the second set of configuration and state information, the second set of client objects representing physical and logical entities including client data stored on a third set of one or more storage devices included in a third RAID group, wherein the second set of client objects are included a client object topology. Reading the first set of configuration and state information may be performed using a second code portion that issues the first set of one or more calls to the first code portion, wherein the second code portion may create and initialize a first structure included as a first parameter of the first set of parameters. The first structure may described a RAID geometry of the first RAID group. The first structure may include a list identifying the first set of one or more storage devices as being included in the first RAID group, and a RAID protection level of the first RAID group.

BRIEF DESCRIPTION OF THE DRAWINGS

Features and advantages of the present invention will become more apparent from the following detailed description of exemplary embodiments thereof taken in conjunction with the accompanying drawings in which:

FIG. 6 is an example illustrating steps and associated data flow that may be performed in an embodiment in accordance with techniques herein;

DETAILED DESCRIPTION OF
EMBODIMENT(S)

Figure 1:
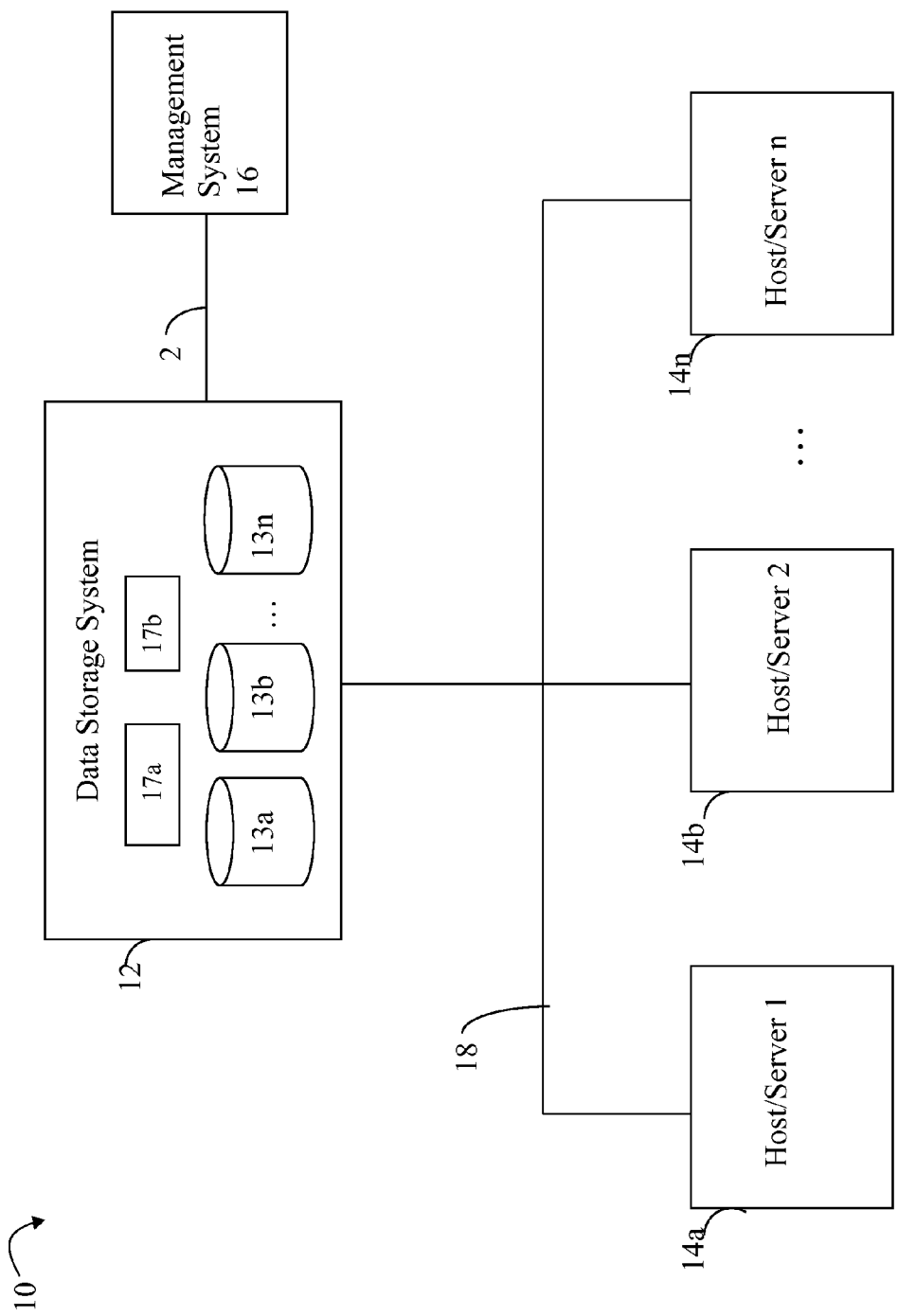
FIG. 1 is an example of an embodiment of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or Fibre Channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems and management system 16 may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

For purposes of illustration, the techniques herein may be described with respect to a single unitary data storage system, such as single data storage array, including two storage processors or computer processing units. Techniques herein may be more generally use in connection with any one or more data storage system each including a different number of storage processors than as illustrated herein. The data storage system 12 may be a data storage array, such as a CLARiiON® data storage array or a VNX® data storage array by EMC Corporation of Hopkinton, Mass., including a plurality of data storage devices 16a-16n and two storage processors 17a, 17b. The storage processors (SPs) 17a, 17b may be computer processing units included in the data storage system for processing requests and commands. In connection with performing techniques herein, an embodiment of the data storage system may include multiple storage processors including more than two storage processors or main CPUs as described. The CLARiiON® data storage system and the VNX® data storage systems mentioned above may each include two storage processors 17a, 17b for performing processing in connection with servicing requests. Additionally, the two storage processors 17a, 17b may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desk top computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
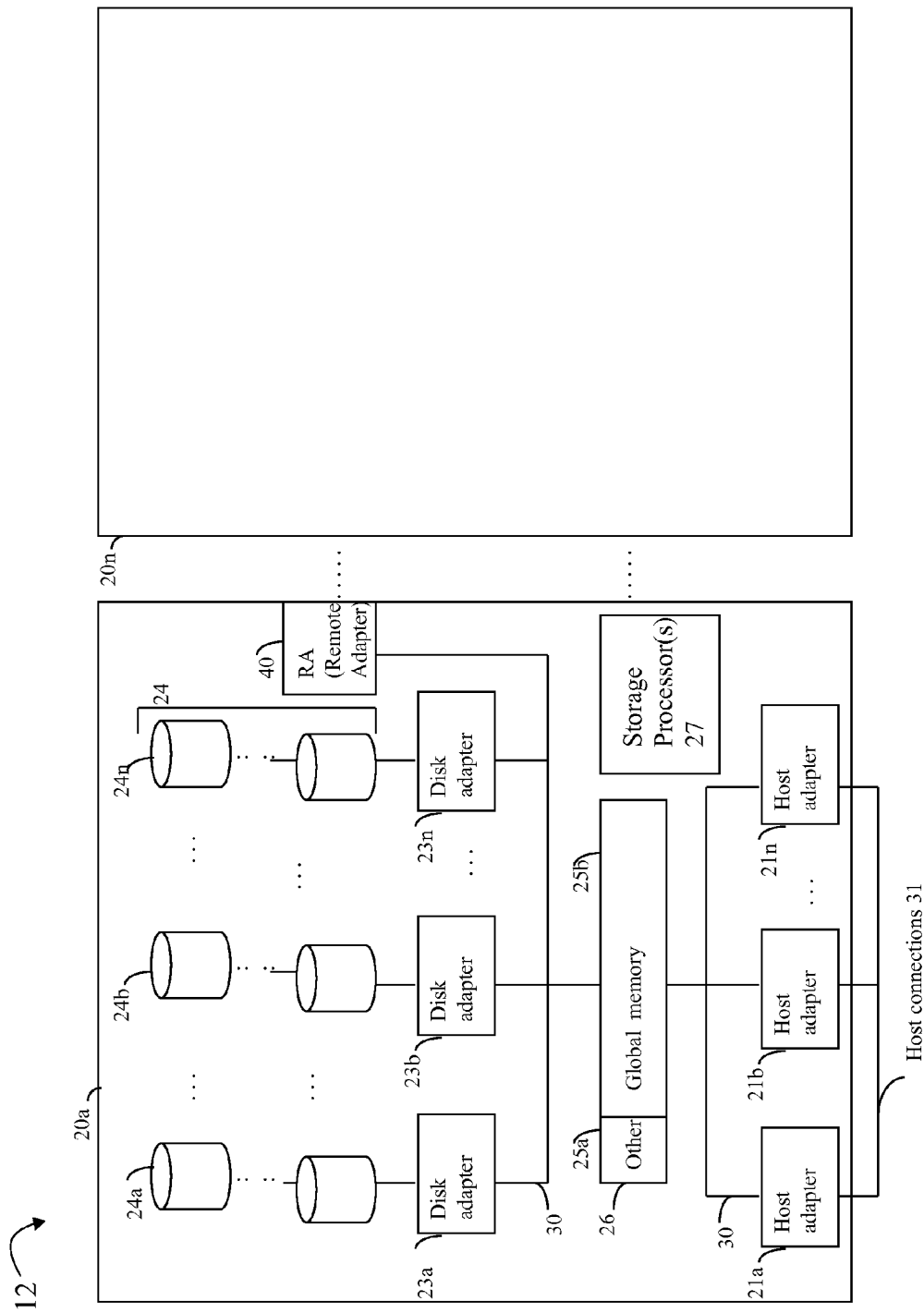
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be a CPU and an embodiment may include any number of such processors. For example, the VNX® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

Also shown in the storage system 20a is an RA or remote adapter 40. The RA may be hardware including a processor used to facilitate communication between data storage systems, such as between two of the same or different types of data storage systems.

As noted above, a data storage system may include two SPs (also referred to as main processors or storage system processors A and B) although a data storage system and techniques herein may be used in an embodiment in which the data storage system includes more than two storage processors as mentioned above.

The two SPs 27 may control the operation of the data storage system. The processors may be configured to process requests as may be received from the hosts, other data storage systems, management system, and other components connected thereto. Each of the SPs may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two SPs. Upon the occurrence of failure of one the SPs, the other remaining SP may handle all processing typically performed by both SPs.

I/O operations performed in a data storage system may include I/O operations which are received by the data storage system from an external client, such as a host. Depending on the data storage configuration, the single host I/O operation, such as for a write operation, may result in more than one write operation to one or more physical drives on the data storage system. For example, if the host write is directed to a logical device, such as a LUN, having storage provisioned from a RAID group having a RAID-1 mirroring configuration with two physical drives, then a single front end or host I/O to the LUN results in two back-end physical device writes to each of the two mirrored physical devices of the storage system comprising the RAID group.

Figure 3:
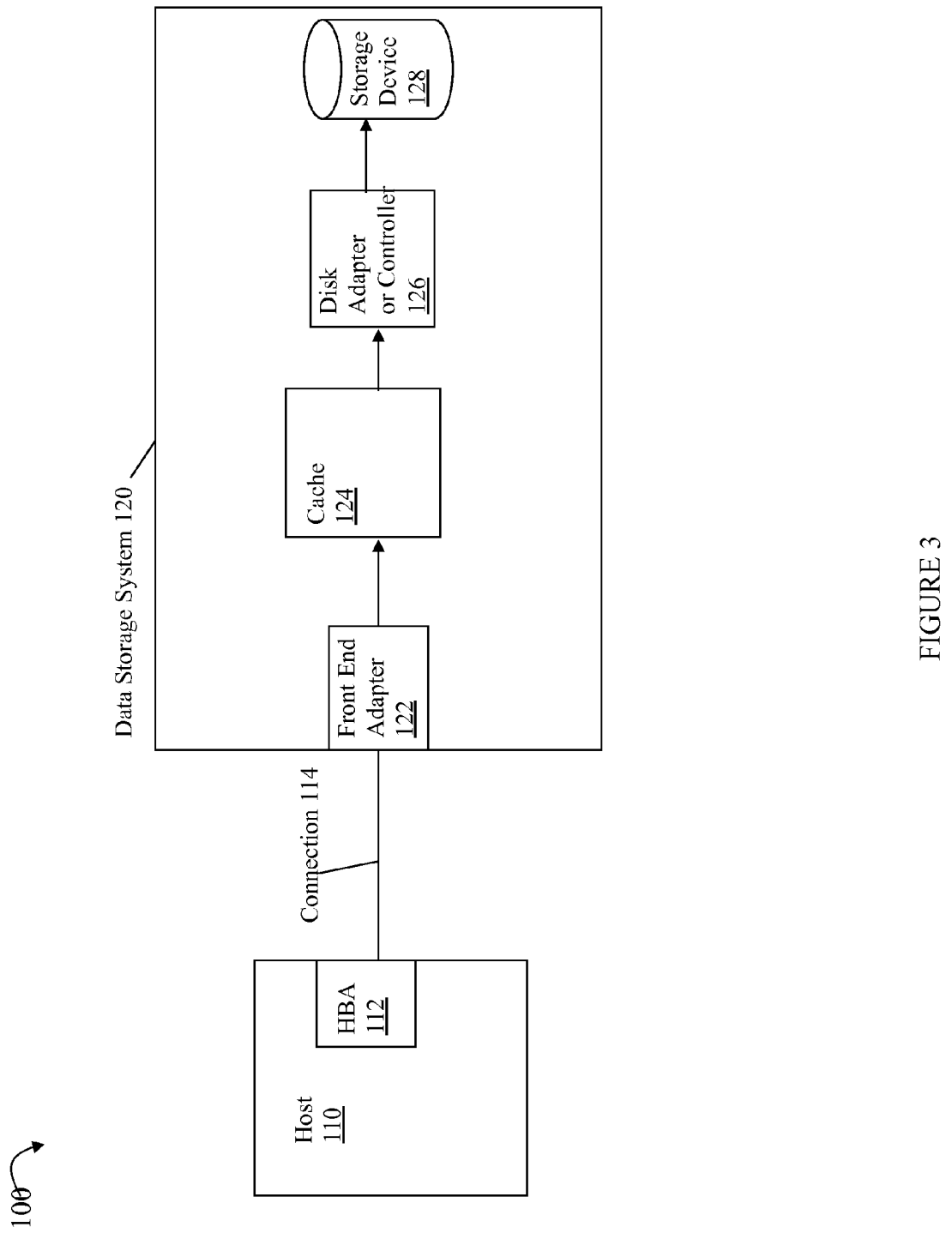
FIG. 3 is an example illustrating a request that may be issued from a host to the data storage system in an embodiment in accordance with techniques herein.

With reference to FIG. 3, shown is an example 100 illustrating components of a system that may be used in an embodiment in accordance with techniques herein. The example 100 includes a simplified view of components of a system as described above. The example 100 includes a host 110 with an HBA 112. The host 110 communicates with data storage system 120 over connection 114. Connection 114 may be, for example, a network connection between the HBA 112 and a front end adapter 122 of the data storage system 120. As described above, a front end adapter 122 may be, for example, an FA. The data storage system 120 also includes a cache 124, a DA or storage controller 126 and one or more physical storage devices 128 (e.g., rotating disks or solid state devices (SSDs) such as a flash drive). The host 110 may issue an I/O operation to the data storage system over connection 114. For example, the host may issue a write operation to write data to a portion of storage device 128. In one embodiment, the data of the write operation may first be stored in cache 124 and then destaged at a later point in time by DA 126 to the physical storage device 128. The foregoing host write operation is an example of an I/O operation of the type described above issued by the client. The single client I/O operation may result in actually writing data to one or more storage devices depending on how the device to which the I/O is directed is configured. When performing a read I/O operation received by the front end adapter 122, processing may first determine whether the data requested is already in cache 124 (thereby resulting in a cache hit or read hit). If the requested read data is in cache 124, the data is retrieved from cache 124 and returned to the host 110. Thus, a read resulting in a cache hit may be serviced without having to access the physical storage device 128 for the data. If the requested data is not in cache 124, the data is retrieved by the DA 126 from the storage device 128, stored in cache 124, and then returned by the front end adapter 122 to the host 110.

As described in more detail in following paragraphs and figures and with reference to FIG. 2, each of the SPs 27 may have its own instance of a data model, such as a object model, that represents various logical and physical aspects of the data storage configuration. The data model may include objects representing physical and logical entities in the data storage system. For example, objects may exist in the model representing the data storage system configuration whereby the objects may represent physical entities such as the physical drives (PDs) and logical entities such as a RAID Group, a LUN, and the like. Each PD may have a corresponding PDO (physical drive object). Furthermore, associated with each PDO may be a PVO (provision drive object) which is used in connection with representing and handling aspects of storage provisioning and other operations with respect the underlying PDO and PD. For example, a PVO may be used to represent aspects of provisioned physical storage of a physical drive (as represented by its PDO associated with the PVO) such as for RAID groups (e.g. indicating that the PD is a member of a particular RAID group). For example, the PVO may be used in connection with coordinating performing a firmware update of a PD associated with the PVO. In one embodiment, it should be noted that if there is no PVD associated with a PD, the PD may not have yet been provisioned and configured into other logical entities, such as into RAID groups, LUNs, and the like, for use in storing client data.

As known in the art, an object may have data fields corresponding to attributes describing the object and associated procedures or routines known as methods. A method may be invoked to perform an action or operation on an object. Objects may be instances of defined object classes. Objects and associated methods may be written using any suitable programming language such as, for example, C++ and Java.

Figure 4:
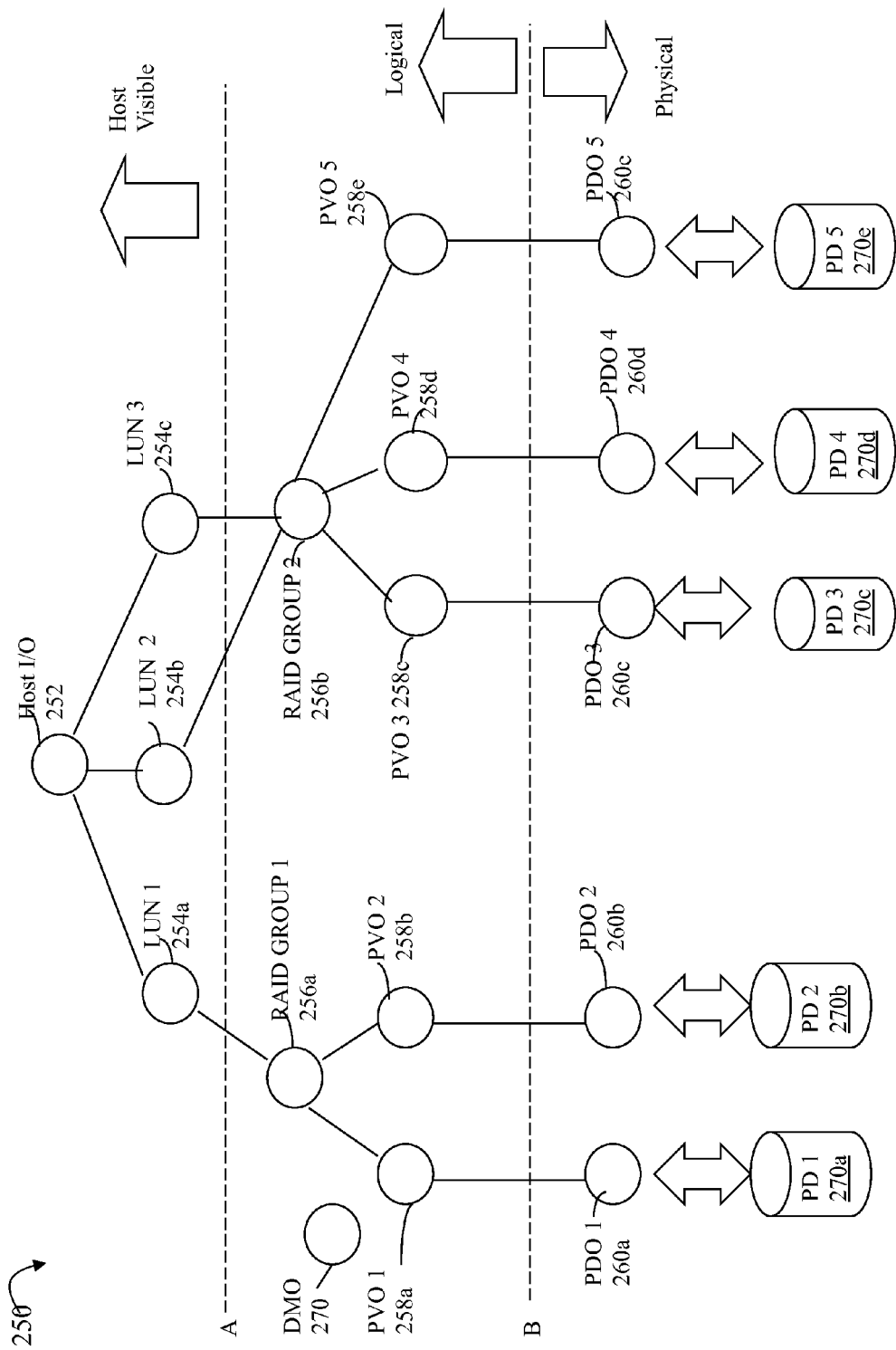
FIGS. 4, 6 and 6A are examples illustrating objects as may be included in an object model or topology in an embodiment in accordance with techniques herein.

Referring to FIG. 4, shown is an example of a graph that may be used in an embodiment in accordance with techniques herein to represent the data model as may be maintained on each SP. The example 250 includes a graph with nodes and edges between the nodes. The graph in this example forms a tree having a root node 252 at a first level, nodes 254a-254c at a second level, nodes 256a-256b at a third level, nodes 208a-258e at a fourth level and leaf nodes 260a-260e at a fifth level. The graph may be a representation of logical and/or physical components in the data storage system with the root node 252 corresponding to an aggregator or external interface node for the data storage system, or more specifically, an interface node to the data storage system. Each node in the graph other than the root node represents an object associated with a corresponding physical or logical entity in the data storage system. The leaf nodes at the fifth level correspond to objects associated with physical storage devices, such as rotating disk drives (e.g., Fibre channel drives, SATA drives) or SSDs (solid state storage devices such as comprising flash-based memory). Nodes at levels other than the first level (root node) and bottom most level (level 5 including leaf nodes 260a-260e) may correspond to, for example, RAID groups, drives or members of a RAID group, LUNs, and the like. In this example, nodes 254a-254c correspond, respectively, to objects associated with LUNs 1-3, nodes 256a-256b correspond, respectively, to objects associated with RAID GROUPS 1 and 2, nodes 258a and 258b correspond to PVOs associated with RAID drives or members of RAID GROUP 1, nodes 258c-258e correspond to PVOs associated with RAID drives or members of RAID GROUP 2, and nodes 260a-260e correspond to physical device objects (PDOs) associated with physical storage devices (PDs) 270a-e. Each PDO may be associated with a single PD, and each PDO may be associated with a single PVO. To further illustrate, object 256a may represent a mirroring configuration object such as for a RAID-1 configuration whereby PD 1 represented by PDO 260a and PD2 represented by PDO 260b are mirrors of each other.

A path in the graph may correspond to an I/O path over which an I/O operation may be forwarded to a physical device (PD) for processing. For example, a host I/O operation directed to LUN 3 to write data may result in writing user data and/or parity information to a portion of PD5 forwarded along the path represented by nodes 252, 254c, 256b, 258e, 260e. The foregoing may be a complete path from the root to a leaf node. An I/O operation may be forwarded along a path from a first node which is at a level M in the graph, M>1 (e.g., the root node is at level 1), to one of its descendant nodes in the graph, such as one of the leaf nodes or other nodes at a level>M in the graph.

Also included in the example 250 are dashed lines denoted as A and B. Portions of the graph above line A may represent those entities of the data storage system which are visible to the host or other external client. For example, the host may send I/O requests directed to one or more LUNs. The host may not have any knowledge regarding underlying RAID groups that may be included in an embodiment. Nodes below line A may correspond to entities known or exposed within the data storage system, but not to the host. Dashed line B represents the partitioning of the graph into nodes corresponding to physical and logical entities. Nodes above line B (other than the root) may correspond to logical entities (e.g., LUNs, RAID groups, RAID drives or members) of the data storage system. Nodes below line B may correspond to physical entities, such as physical storage devices, of the data storage system.

As described herein and illustrated in connection with FIG. 4, an embodiment may utilize a topology of objects to represent a current configuration and state of the data storage system. An I/O operation may be represented by a I/O path in the object topology such as illustrated in FIG. 4 whereby the I/O operation processing may be characterized as traversing the I/O path in the object topology when servicing the I/O operation request. Additionally there may be services, such as a library of service routines, invoked at different levels in the object topology such as by methods of the objects in the path.

Figure 5:
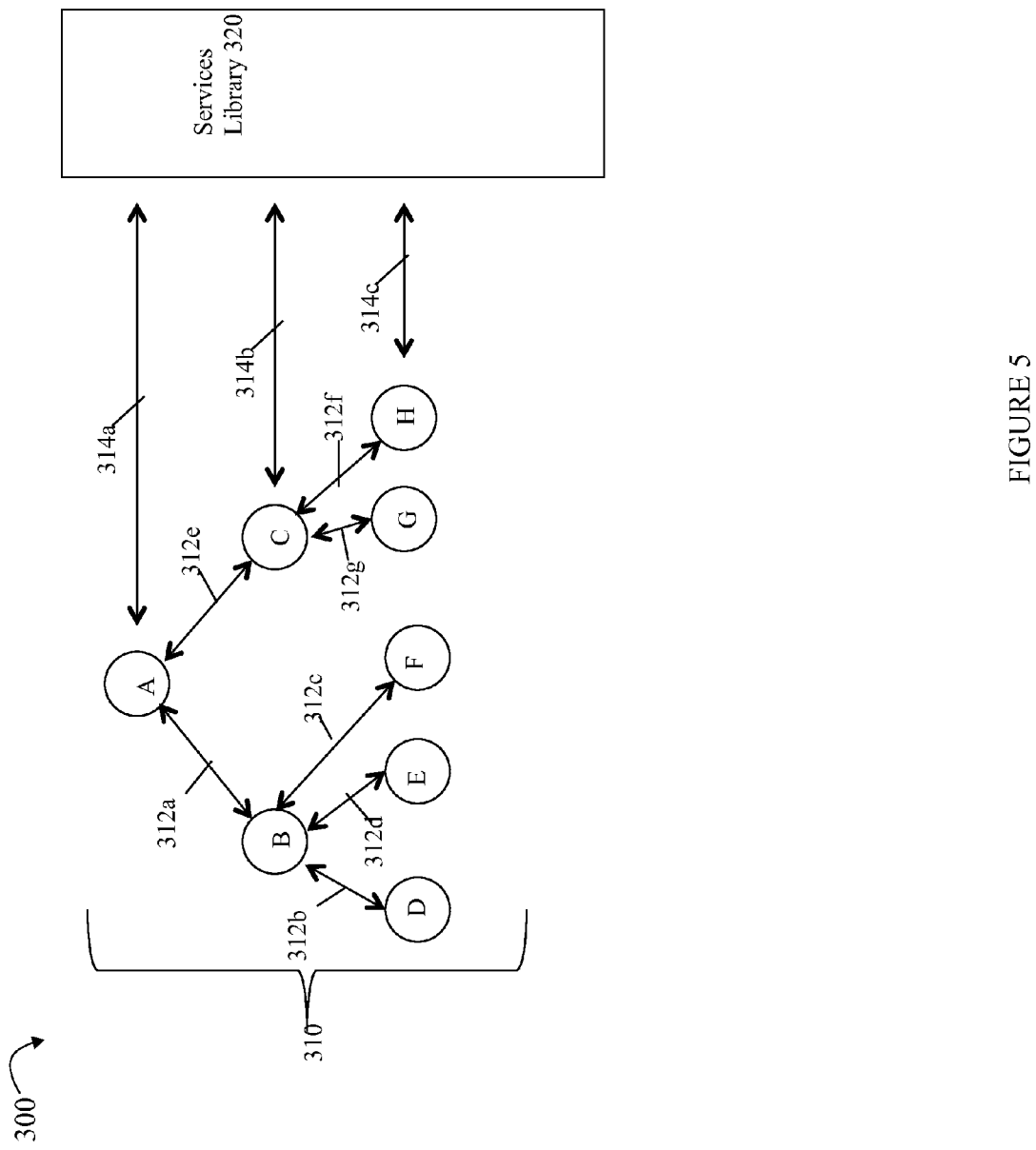
FIG. 5 is an example illustrating a topology of objects and additionally a services library in an embodiment in accordance with techniques herein.

Referring to FIG. 5, shown is an example 300 illustrating a topology of objects and additionally a services library 320 in an embodiment in accordance with techniques herein. The example 300 includes a generic representation of an object topology 310 that may represent the configuration and state of the data storage system at a point in time. The topology 310 is a more generalized or generic representation of objects from that such as illustrated in more detail in FIG. 4. Element 320 may represent a services library of routines that may be invoked at different levels in a particular runtime object stack for an I/O request. The example 300 includes flow arrows 312a-f generally representing possible runtime execution flow up between various objects in the topology when servicing I/O requests. Additionally, flow arrows 314a-c represent the possible runtime execution flow between the services library 320 and various objects at different levels in the topology 310. It should be noted that arrow 314b generally represents possible runtime execution flow between any of nodes B,C at level 2 in the object topology and arrow 314c generally represents the possible runtime execution flow between any of the leaf nodes D, E, F, G, and H at level 3 in the object topology.

Thus, in servicing an I/O operation, code may be executed at various levels in the runtime object stack represented by a particular path in the object topology 310. Additionally, a routine of the service library 320 may be invoked by objects, or more specifically a method thereof, at various levels of 310 as illustrated by any of 314a-c.

As noted above, an embodiment may utilize an object topology to represent the physical and logical storage entities. As described in following paragraphs, such an object topology may be used in connection with storage entities used privately or internally by the data storage system, and also in connection with storage entities storing user data.

Each object may include configuration information and state information characterizing, respectively, the configuration and state of the data storage system physical or logical entity represented by the object. Such configuration and state information may be included in the object, for example, as attributes of the object. Thus, the particular configuration and state information may vary with the particular type or class of object described. For example, consider a RAID group (RG) object. The configuration information for the RG object may specify information describing the RG configuration such as, for example, the number of PDs, the RAID protection level (e.g., RAID-1 which is mirroring with no parity or striping, RAID-5 which provides block level striping and distributed parity information, and possibly other supported RAID levels), and the like. The RG state information may indicate the state of the RAID group, for example, whether the RAID group is currently in the process of an internal RG rebuild and if so, the PD(s) being rebuilt.

The configuration and state information for the objects may be specified as part of initializing or instantiating the objects. In an embodiment in accordance with techniques herein, there may be a first set of system objects and an associated topology describing storage entities used internally by the storage system. A first set of configuration and state information may be used to initialize or instantiate objects of the first set for storage entities (e.g., LUNs, RGs, and the like) used internally or by the system for storing system private data.

There may also be a second set of system objects and associated topology describing storage entities used in connection with client storage such as for LUNs, RGs, and the like, for storing user data. The objects and topology in the second set may be exported or exposed to clients such as through data storage system management software. Additionally, objects and topology of the second set may be created, for example, in response to a data storage system manager configuring PDs into a desired RAID group configuration, provisioning storage for a LUN from a RAID group for use by a host or host-side application, adding new PDs to the system, and the like. A second set of configuration and state information may be used to initialize or instantiate objects of the second set for client or user provisioned storage.

The foregoing first set of objects may be characterized as internal or private in that they may not be published or exposed such as through management software. The private objects may be used internally by code executing on the data storage system to describe storage used by the system for storing information about user or client objects (of the second set) describing client storage. For example, an RG object, a LUN object, and associated one or more PD objects in the first set may describe storage provisioned for storing data (e.g., configuration and state information) regarding objects of the second set. Thus, objects of the first set may describe storage entities used to store the second set of configuration and state information for objects of the second set.

Additionally, the first set of configuration and state information used to initialize or instantiate private or system objects of the first set may also be stored on yet another third set of private or system storage entities (e.g. RGs, LUNs, and PDs) whereby such first set of configuration and state information needs to be obtained therefrom as an initial step prior to subsequently initializing or instantiating the first set of objects in order to perform such initialization of the first set of objects. More specifically, as part of booting the data storage system, the following describes an ordering of steps may be performed as part of the boot sequence:

1) read first set of configuration and state information from the third set of private or system storage entities (e.g., RGs, LUNs, PDs);

2) instantiate private or system objects of the first set using the first set of configuration and state information whereby objects of the first set represent private or system storage entities (e.g., such as RGs, LUNs) containing the second set of configuration and state information for client-based objects describing client or user provisioned storage;

3) read second set of configuration and state information from first set of private or system storage entities; and 4) instantiate user or client objects of the second set using the second set of configuration and state information whereby objects of the second set represent user or client storage entities such as storage provisioned for storing user or client (e.g., host) data.

The user or client objects may be exposed or exported such as for use in connection with data storage system management software to represent an existing configuration of the data storage system for user or client provisioned storage.

Such storage entities (e.g. RGs, LUNs, PDs) of the third set used to store the first set of configuration and state information may also be configured in a RG thereby providing the first set of configuration and state information with all the benefits and features of RAID configured physical storage such as may be used in connection with client provisioned storage. As known in the art, such benefits and features may vary with the particular RAID protection level and configuration and may include, for example, internal RAID group rebuilding and protection, various data storage system services, and the like.

As used herein, private objects or system objects (e.g., such as of the first set noted above) may refer to those objects created, such as at boot time, in order to subsequently read (from system or private storage entities) the second set of configuration and state information for user or client objects representing associated client storage entities. The data storage system logical and physical entities (e.g., RGs, LUNs, PDs) represented by such private or system objects may be referred to as private or system storage entities. Additionally, the term private or system entity is also used herein to refer to the physical and logical storage entities of the third set also used privately by the system for storing configuration and state information for the first set of objects describing private or system storage entities of the first set.

Client objects or user objects (e.g., such as of the second set noted above) may refer to those objects, such as of the second set, representing physical and logical storage entities for user or client data. The data storage system logical and physical entities represented by such user or client objects may be referred to as user or client entities.

Figure 6:
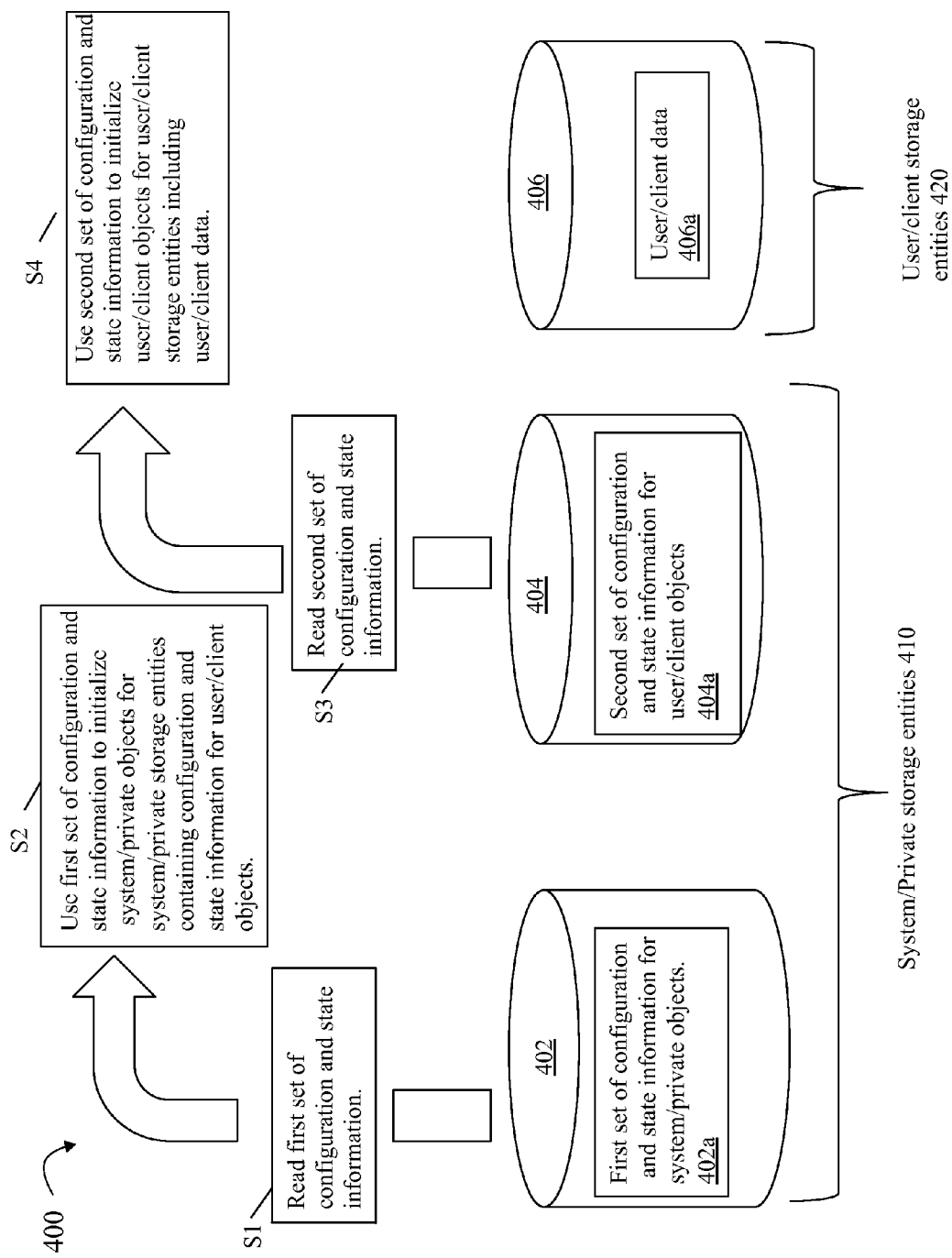

Referring to FIG. 6, shown is an example illustrating storage entities and associated objects that may be used in an embodiment in accordance with techniques herein. The example 400 includes system or private storage entities 410 and user or client storage entities 420. Consistent with description above and elsewhere herein, the system or private storage entities 410 may include the various physical and logical storage entities, such as RGs, LUNs and PDs, used to store data that is used privately or internally within the data storage system. Element 402 may represent the one or more private or system storage entities used for storing the first set of configuration and state information for system or private objects 402*a*. Thus, element 402 may represent the private or system storage entities of the third set described above. Element 404 may represent the one or more private or system storage entities used for storing the second set of configuration and state information for user or client objects 404a. Thus, element 404 may represent the private or system storage entities of the first set described above. Element 406 may represent the one or more user or client storage entities for storing the client or user data 406. Thus element 406 may represent the user storage entities second set described above.

As described in more detail elsewhere herein, when booting the data storage system a sequence of steps may be performed. As a first step S1, the first set of configuration and state information for system or private objects 402a may be read from private storage entities 402. As a second step S2, the first set of configuration and state information 402a may be used to instantiate or initialize system or private objects for the system or private storage entities 404 containing the configuration and state information for user or client objects 404a. As a third step S3, the second set of configuration and state information for user or client objects 404a may be read from system or private storage entities 404. As a fourth step S4, the second set of configuration and state information may be used to initialize or instantiate the user or client objects representing the user or client data storage entities 406 containing the user data 406a.

In connection with the above-mentioned sequence of steps, there exists a bootstrap problem in connection with reading in the first set of configuration and state information for the system or private objects 402a in step S1. At system boot time in step S1, the existing software infrastructure used to implement the runtime I/O stack and object model as illustrated in FIGS. 4 and 5 is not yet completely loaded and available for use. Thus, although the first set of information 402a may be stored on PDs configured into RGs and LUNs, all the objects, such as the RG and LUN objects, representing such storage entities have not yet been instantiated.

As described in more detail in following paragraphs, special processing may be performed to perform this initial read of the first set of configuration and state information 402a. Such special processing may include interfacing with code (e.g., RAID library) at the RAID Group (RG) level in the runtime I/O stack without using an RG object since no such RG object exists. For example, with reference back to FIG. 4, at this point in the boot sequence, it may be that only objects at the lower PD levels (e.g., objects 258a-e and 260a-e) exist for private or system PDs represented by 402. Thus, techniques described in following paragraphs "plug into" or "hook into" the runtime I/O stack above this PD level at the RG level and interface directly with a RAID library. Processing performed by the RAID library may be generally represented as a services library such as illustrated by 320 of FIG. 5.

In the typical I/O stack as described in FIGS. 4 and 5, a method of an RG object such as 256a or 256b would interface with the RAID library and lower level PD objects (e.g., 258a-e, 260a-e). Alternatively, techniques described in following paragraphs provide for using a special routine or body of code to directly interface with the RAID library and the lower level PD objects at the point S1 in the boot sequence thereby having the special routine or body of code being used in place of an RG object and its associated methods.

Figure 6A:
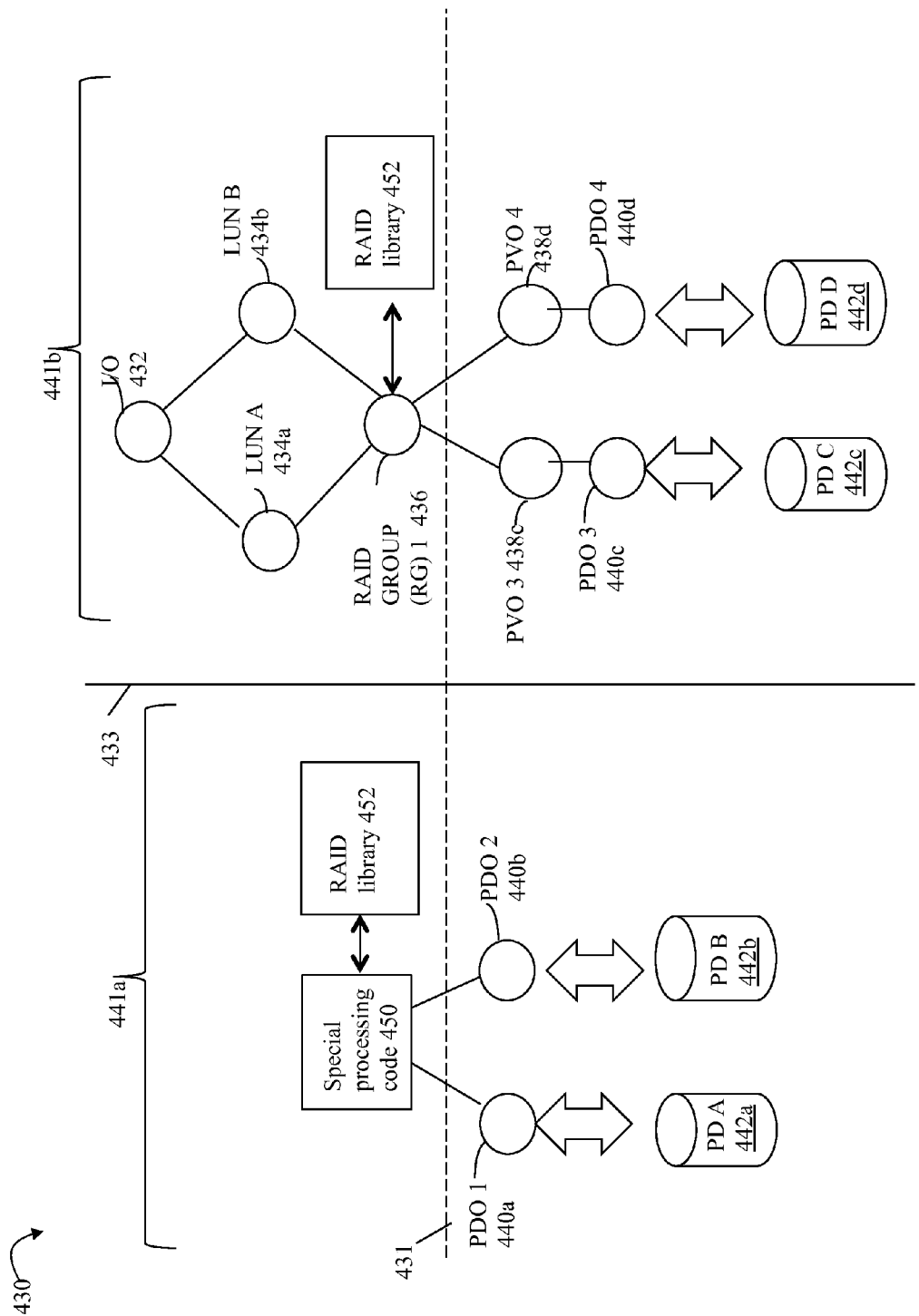

Referring to FIG. 6A, shown is an example 430 illustrating use of techniques herein in connection with steps S1-S4 of FIG. 6. Element 441a illustrates the objects and components that may be used in performing step S1. PDs 442a-b may be PDs storing the first set of configuration and state information used to initialize system/private objects. Objects 440a-b may exist in the system at this point in the boot sequence but no higher level objects, such as PVOs, LUNs, RGS, and the like, may exist and be suitably initialized for use in performing I/O operations. Element 450 represents the special processing code that interfaces directly with the RAID library 452 and lower level objects 440a-b to read the first set of configuration and state information. Thus, the code 450 interfaces with 452, 440a and 440b rather than a RG object since such a RG object is not yet in existence at this early processing point in the boot sequence. Elements 440a-b and 442a-b may represent private or system objects and entities of the third set noted above (e.g., represented by element 402 of FIG. 6). It should be noted that PVOs corresponding to PDOs 438a-b may be in existence at point S1 in the boot sequence but such PVOs may not be completely initialized at this point S1. Thus, the special processing code 450 may interface directly with 440a-b or otherwise, although not illustrated, interface with partially initialized PVO objects corresponding to PDOs 438a-b provided that processing performed in an embodiment does not require use of any PVO object information other than as provided by the partially initialized PVOs.

It should also be noted that although 442a-d may represent different physical drives, 442a and 442c may actually refer to the same first physical drive but at different offsets, and 442b and 442 may refer to the same second physical drive but at different offsets. For example, assume 442a-b are configured into a RAID-1 mirroring configuration and that 442c-d are also configured into a RAID-1 mirroring configuration. In this case, data stored on PD A 442a may be mirrored on PD B 442b and similarly data stored on PD C 442c may be mirrored on PD D 442d. Elements 442a-b may represent two PDs using one set of offsets on the drives and elements 442c-d may represent the same two PDs using a different set of offsets on the drives.

Once the first set of configuration and state information is read in step S1, the system or private objects of the first set representing the private storage entities 404 may be instantiated in step S2. The system or private objects of the first set instantiated may include objects representing private storage entities such as RGs, and LUNs, PDs, and the like, as described in connection with FIGS. 4 and 5, which can now be used with the runtime I/O stack and software infrastructure as also described above. To further illustrate subsequent processing following step S1 represented by 441a, element 441b includes the objects and components that may exist in the system after completing step S2. In step S2, system or private objects 434a-b, 436, 438c-d and 440c-d may be instantiated. The second set of configuration and state information for user/client objects 404a may be stored on PDs 442c-d.

Thus, step S3 which reads the second set of configuration and state information 404a may be performed through issuing a read request to a private LUN included in 404 and processing such read request using the runtime I/O stack as described in connection with FIGS. 4 and 5. In this manner, reading the second set of configuration and state information 404a may be performed using the same runtime I/O stack, interfaces, code, and the like, as when processing client read requests. For example, with reference to FIG. 6A 441b, the read request in step S3 may be issued as an I/O operation request 432 to read the second set of configuration and state information from a private LUN, such as LUN A 434a, having data stored on PD 442c using the following runtime I/O stack of objects 434a, 436, 438c, 440c.

In the fourth step S4, the second set of configuration and state information is used to initialize the client or user objects for client or user storage entities 406 containing user or client data 406a. Subsequently, the client or user objects may be exported. Also, user or client I/O requests may be processed using the runtime I/O stack of objects as described herein (e.g., FIGS. 4 and 5). Instantiating client or user objects in step S4 may include creation of another topology of user or client objects such as described in FIGS. 4 and 5. The user or client object topology created may include RG objects, LUN objects, and the like, as illustrated in FIGS. 4 and 5 and also in 441b of FIG. 6A. In this manner, the user or client I/Os may be processed using an object topology that includes objects representing LUNs, RGs, and the like, whereby the RG objects (or methods thereof) interface with the RAID library 452. Thus, the same body of code denoted by RAID library 452 may be used during system boot and also during normal or typical I/O processing of client I/Os.

In accordance with techniques herein such as illustrated by 441a, the first set of configuration and state information may be stored at a predetermined or known location on a predetermined set of PDs 442a-b having a predetermined RG configuration from which storage is provisioned for one or more LUNs for private or system use. For example, particular PDs of the data storage system may be configured into a private RG having a RAID-1 configuration with two LUNs 442a-b for private or system use in storing the first set of configuration and state information 402a.

Techniques herein provide for having the code 450 perform a RAID library API call to the RAID library 452 in connection with reading the first set of configuration and state information 402a from the predetermined location. Since the location of the first set of configuration and state information and the RG configuration may be characterized as known, fixed or predetermined, an embodiment may create and initialize appropriate parameters or structures for use with the API call whereby such parameters or structures specify the known location in the private RG to read the first set of configuration and state information. As illustrated in 441a of FIG. 6A, the RAID library 452 and associated API may be used in connection with the special processing code 450 to read in step S1 the first set of configuration and state information. As also illustrated in 441b of FIG. 6A, the same RAID library 452 may be used in connection with reading the second set of configuration and state information in step S3 along with using the LUN and RG objects of the runtime I/O stack of objects whereby a method of the RG object 436 may perform the API call to the RAID library 452 (rather than the code 450 as in 441a).

The special processing code 450 may create and appropriately initialize the necessary RAID library API call parameters typically performed using structures existing as part of a RG object such as 436 or otherwise using information typically provided from higher level objects of the runtime I/O stack of objects (e.g., with the runtime I/O stack of objects, a method of the RG object may receive one or more parameters from a method of a LUN object whereby the one or more parameters from the LUN object specify details of the I/O operation).

In connection with runtime processing flow with the components of 441a, special processing code 450 may first obtain information from the PDO objects 440a-b such as regarding the state of the particular PDs used to store the first configuration and state information. Secondly, the special processing code 450 may use such information obtained from the PDO objects 440a-b along with other information available to 450 regarding the known location of where the first configuration and state information is stored to initialize the appropriate structures or other parameters for the API call to the RAID library 452. As described in more detail below, the API call from 450 to the RAID library 452 may specify a RAID geometry which is information regarding the RAID group configuration of the known location where the first configuration information is stored. The RAID geometry may, for example, identify objects, such as PDOs 440a-b corresponding to the particular PDs 442a-b of the RAID group including the first set of configuration and state information. The API call may also specify an I/O structure as a parameter whereby the I/O structure specifies an I/O operation request to read data from the known location in the RAID group at which the desired first set of configuration and state information is located. Thirdly, the RAID library 452 may then communicate with a method of one of the PDOs 440a-b to read the requested first set of configuration and state information. It should be noted that the code of the RAID library 452 may use the information provided in the API call—the RAID geometry and the known location—to determine the physical device and location on the physical device of the data requested. In other words, code of the RAID library may perform processing to map the specified known location which may be expressed in terms of a RAID group logical location or address to the physical device location which may vary depending on the particular RAID group configuration. This is described in more detail below. Fourthly, the RAID API call may return the requested read data, the first configuration and state information, to the code 450.

In connection with issuing the read request using the I/O runtime stack of objects in 441b, the RAID API call between RG object 436 and the RAID library 452 may be performed by a method of the RG object 436. Parameters of the call may include parameters as described above when the API call is issued to the RAID library 452 from 450. As noted above, the parameters may include the RAID group geometry (of the RAID group in which the first configuration and state information is stored) and the I/O operation read request (specifying to read data from the known location of the first set of configuration and state information). In connection with the RAID library API call from the RG object 436, it should be noted that the RAID geometry may exist as part of the instantiated RG object 436 and the I/O operation read request may be passed to the method of the RG object 436 down the I/O stack of objects. For example, if the known location is on a particular LUN, such as LUN A 434a, the I/O request (read) may represented by 432 which is then passed to a method of the LUN object 434a. The I/O request may then be passed as an input parameter to a method of the RG object 436. It should be noted that the RAID geometry information in the API call from 436 to 452 may identify PVOs 438c-d rather than PDOs 440c-d for the particular PDs as described above in connection with the call from 450 to 452. The RAID API call from 436 to 452 may return the requested read data, the first set of configuration and state information, to the requesting method of 436.

More generally, the same RAID library 452 (e.g., same code portion or routine) may be used in connection with reading the first set of configuration and state information as illustrated in connection with 441a, reading the second set of configuration and state information as illustrated in connection with 441b, and also when subsequently processing client I/O requests using an I/O runtime stack based on a client object topology representing physical and logical storage entities containing user data.

Figure 7:
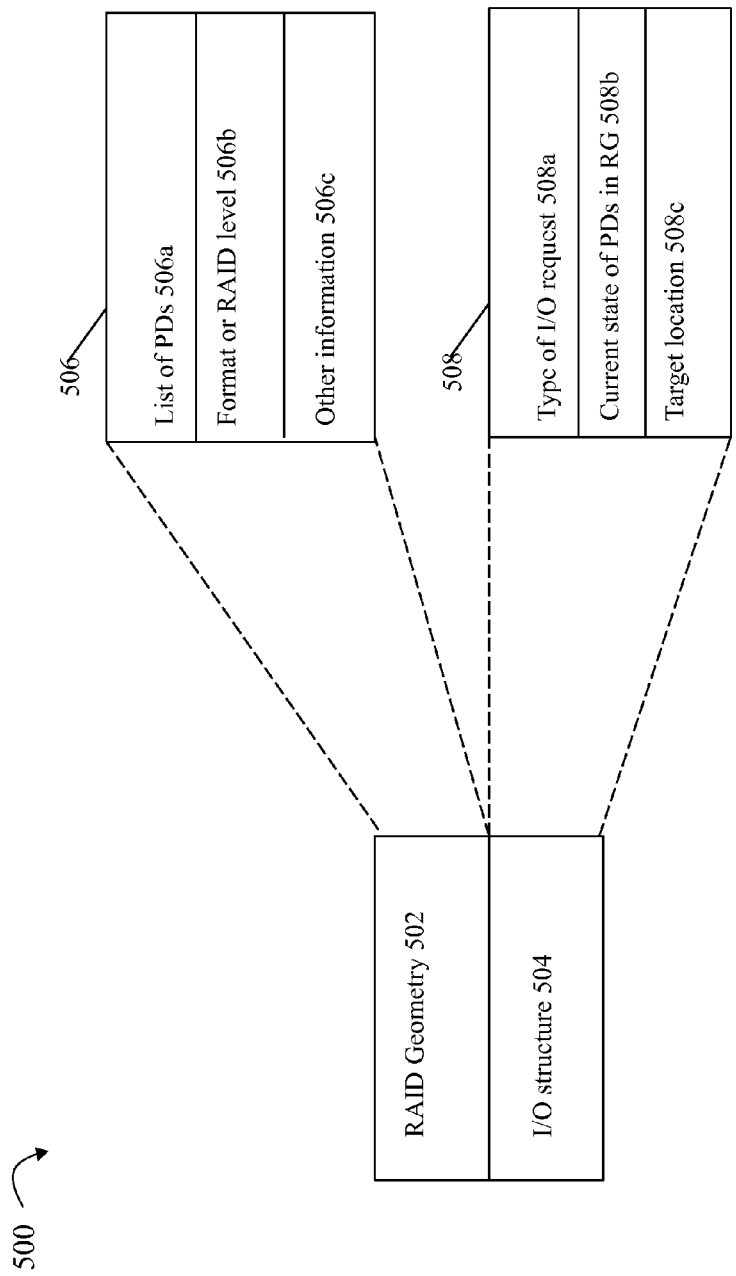
FIG. 7 is an example illustrating parameters passed to a RAID library API (application programming interface) call that may be performed in an embodiment in accordance with techniques herein.

Referring to FIG. 7, shown is an example 500 illustrating the structures or parameters that may be specified in the RAID library API call to read the first set of configuration and state information 402a in an embodiment in accordance with techniques herein. The RAID library API call parameters may include a first structure or first set of parameters describing the RAID group (RG) geometry 502 and a second structure 504 that is an I/O structure or set of parameters describing the I/O operation requested.

With reference back to 441a of FIG. 6A, the special processing code 450 may create and initialize the structures 502 and 504 when performing step S1. When performing step S3 as illustrated using the object topology 441b, the data of structure 502 may be included as part of the RG object 436 and the data of structure 504 may be passed down to the method of the RG object 436 (from which the API call to 452 is made) as an input parameter (e.g., such as from one or more higher level objects such as LUN object 434a in the runtime I/O object stack). Such data for 502 and 504 may be specified in the RAID library API call performed by a method of RG object 436.

Element 506 illustrates in further detail information that may be specified for the RG geometry 502 describing aspects of the RG configuration. Information of the RG geometry may be generally characterized as static and will not change with each I/O operation performed. The RG geometry 506 may include: a list 506a identifying the particular PDs configured into the RG, and the format or RAID protection level (e.g., RAID-1, RAID-5, RAID 6) 506b, and possibly other information 506c not illustrated that may vary with the particular RAID level. For example, RAID-5 provides for block level striping with distributed parity. Other information 506c that may be specified for RAID-5 may identify information regarding the striping such as the stripe element size and stripe size. The stripe element is the amount of contiguous data stored on a single disk of the stripe. Stripe elements may be measured in 512 byte blocks or in kilobytes (KB). The stripe element size may be, for example, 128 blocks, which is 64 KB) and stripe size. The stripe size is the amount of user data in a RAID group stripe. This does not include drives used for parity or mirroring. The stripe may be measured in KB and may be calculated by multiplying the number of stripe disks by the stripe element size. Element 506a may identify a list of objects, such as PDOs or PVOs, corresponding to the PDs included in the RAID group. Thus, the RAID geometry 502 may be characterized as initializing and specifying the RAID group configuration containing the data being operated upon (e.g., read or written) in connection with the I/O request specified by the I/O structure 504. With reference back to FIG. 6A, the API call from 450 to 452 may identify the PDOs 440a-b representing the PDs 442a-b containing the desired data (e.g., first set of configuration and state information) to be read. With reference back to FIG. 6A, the API call from 436 to 452 may identify the PVOs 438c-d representing the PDs 442c-d containing the desired data (e.g., second set of configuration and state information) to be read.

Element 508 illustrates in further detail information that may be specified in the I/O structure 504. The I/O structure 508 may identify: the type of I/O operation 508a (e.g., read or write), a current state 508b regarding the RG, and a target location 508c. To further illustrate information that may be specified in fields 508b and 508c, consider the following example for a RG having a RAID-1 mirroring configuration. In this case, the current state 508b regarding the RG may, for example, specify whether a particular PD of the RG includes a current complete copy of data (and is therefore a valid mirror and in a healthy or good state) or whether the PD may be characterized as not including a complete copy of the data (e.g., not a valid mirror or is in a degraded state). With reference back to FIG. 6A in connection with the call made to the RAID library 452 from code 450, information specified in 508b may be obtained, for example, by code 450 from the PDOs 440a-b, prior to the API call by code 450 to 452. In connection with the call made to the RAID library 452 from a method of the RG object 436 as in FIG. 6A, information specified in 508b may be obtained, for example, by a method of the RG object 436 from a method of the PVOs 438c-d, prior to the API call from 436 to 452.

Figure 8:
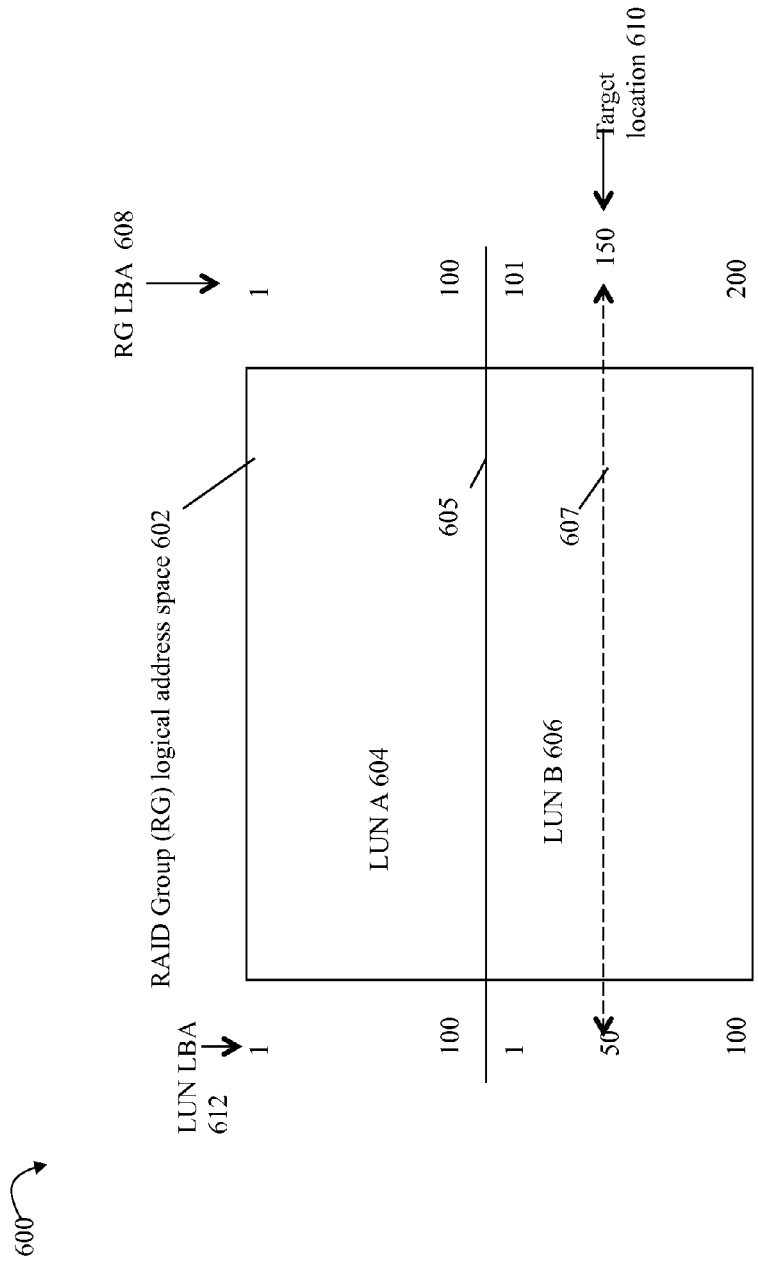
FIG. 8 is an example illustrating LUN to RG logical address space mapping that may be used in an embodiment in accordance with techniques herein.

In connection with information that may be specified in the target location 508c, reference is now made to FIG. 8. The example 600 of FIG. 8 illustrates an RG having two LUNs—LUN A 604 and LUN B 606—with storage provisioned from the RG for private use in connection with storing the first set of configuration and state information 402a. Element 602 may represent the RG logical address space 602 representing the logical address space of capacity for storing data independent of the underlying RG configuration. In other words, the RG address space is an abstraction of the underlying physical RG configuration whereby the RG logical address space represents the amount of data that can be stored in the RAID group. The target location 508c may represent an offset or logical block offset (LBA) in the RG logical address space 602. For example, LUN A 604 and LUN B 606 may be private LUNs each having 100 blocks. The LUNs A and B 604, 606 may be configured for use in storing the first set of configuration and state information 402a at a predetermined location of LUN B, LBA 50 denoted by target location 610. Element 612 denotes the LUN-based LBAs and element 608 denotes the RG LBAs. Line 605 may denote the partitioning of the RG logical address space 602 among LUN A 604 and LUN B 605. Line 607 may represent the mapping of the target location 610 as expressed using a LUN-based address or location of 612 to a corresponding RG-based address or location 612. In this case, the first set of configuration and state information 402a may be stored on LUN B, LBA 50 which maps to a corresponding RG location or LBA of 150. The target location field 508c of FIG. 7 represents the mapping of the LUN-based location to a corresponding RG location in accordance with the RG logical address space 602. In this example, the RG LBA or location=150 may be specified in field 508c.

Although the example illustrates a particular target location, LUN, and the like, such details are for illustration purposes. More generally, the target location 610 may be any known or predetermined location on any private or system LUN.

In accordance with techniques herein, the target location 610 at which the first set of configuration and state information 402a is known or predetermined. Additionally, the particular RG configuration of the RG including the target location 610 is also known of predetermined. Thus, the special processing code may create and initialize the structures 502 and 504 of FIG. 7 to include appropriate information for a read request to read the first set of configuration and state information 402a from the known target location 610.

The code of the RAID library 452 may map the RG logical address specified as the target location (provided as an input in the API call) to a physical device and location of the requested data for the I/O operation. As will be appreciated by those skilled in the art, the physical device and location on the physical device corresponding to the specified RG logical address space may vary with the particular RAID group configuration. For example, the number of PDs as well as the location of the data on which PD will vary with whether the RAID group is configuration as a RAID-1 group or a RAID-5 group. Thus, the mapping of the RG logical address to PD location will also vary. It should be noted that in a RAID-1 group configuration whereby all data is mirrored and two copies are stored on two different PDs of the RAID group, the same data may be read from two PDs of the RAID group. In this case, code of the RAID library 452 may select one of the PDs from which to read requested data. For data that is written to a RAID-1 group, code of the RAID library 452 may handle performing two writes to both PDs. In a similar manner, and more generally, code of the RAID library 452 may handle obtaining any requested read data from an appropriate PD based on the RAID group configuration and also writing the one or more copies of the user data, along with any necessary parity data, to the appropriate PDs based on the RAID group configuration.

It should be noted that the foregoing describes an API call to the RAID library 452 whereby the parameters of the example 500 of FIG. 7 may be included in a single API call. More generally, the processing performed as described above with the single API call may also be performed by multiple API calls to the RAID library 452 depending on the particular implementation. For example, an embodiment may perform a first API call including the RAID geometry 502 to initialize the RAID group. Subsequently, one or more I/O operations may be performed in which a separate API call is made to the RAID library 452 for each I/O operation and include an I/O structure 504 for the particular I/O operation requested. As will be appreciated by those skilled in the art, the foregoing as well as other variations may exist in connection with embodiments in accordance with techniques herein.

The foregoing describes techniques providing the ability to use a single set of code, the RAID library 452, during both system boot and also during normal typical I/O processing such as for processing host, or more generally client, I/O requests. This allows an embodiment to leverage RAID features and benefits whereby the configuration and state information used by the system (e.g., for both the first and second sets of configuration information 402a, 404a) is provided with the same RAID protection, benefits and advantages (e.g., rebuilding, rebuild logging, etc.) as provided for storing user data. At boot time, the RAID library is used to access the first set of configuration and state information in order to bootstrap the system by creating system or private objects. Such boot time use of the RAID library is performed without use of higher level LUN and RG objects and thus without the typical runtime I/O object stack. Subsequent to boot time such as when processing host I/O operations, the same RAID library may be used with the runtime I/O object stack including objects for LUNs, RGs, and the like.

Figure 9:
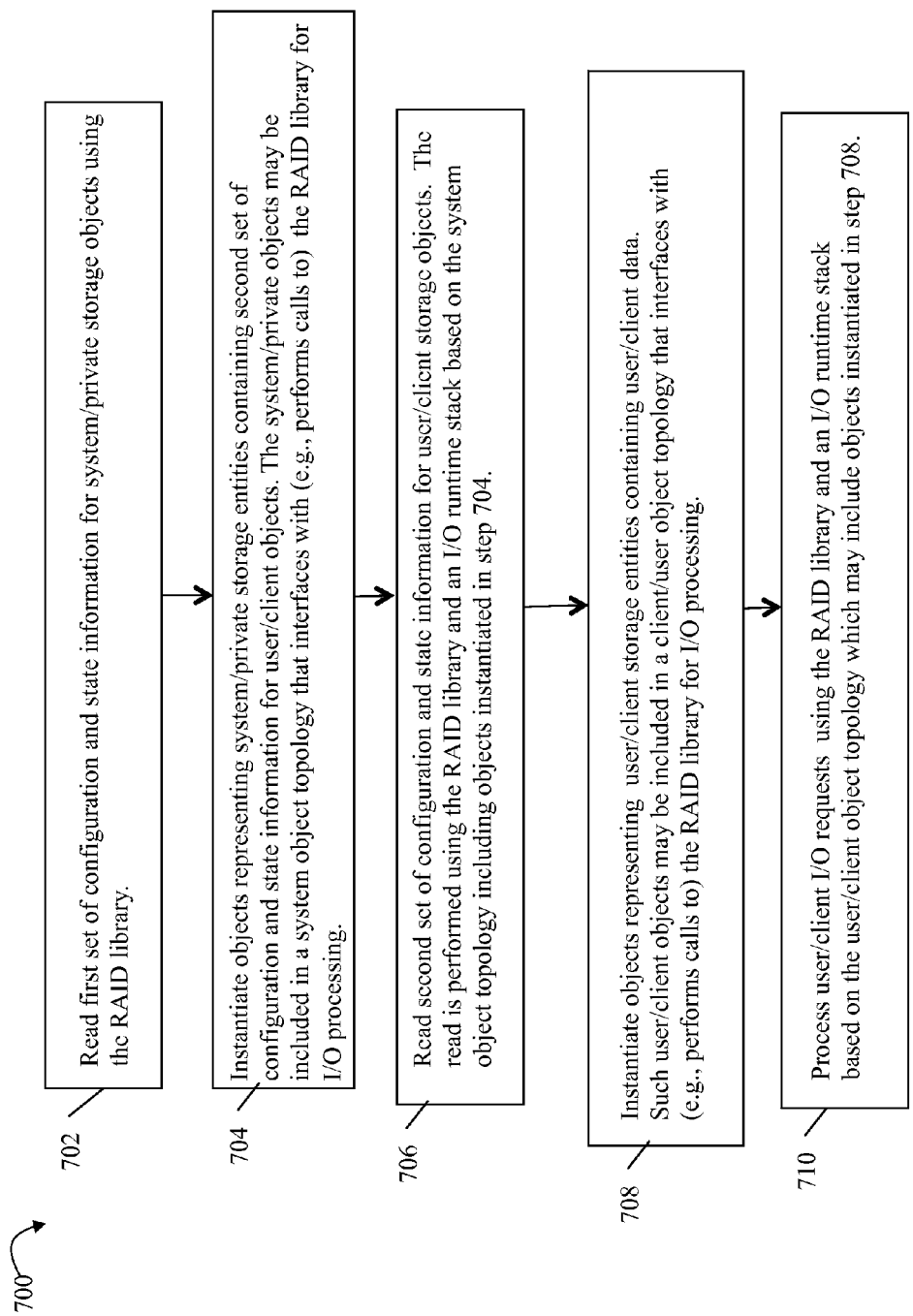
FIG. 9 is a flowchart of processing steps that may be performed in an embodiment in accordance with techniques herein

Referring to FIG. 9, shown is a flowchart of processing steps that may be performed in an embodiment in accordance with techniques herein. The flowchart 700 summarizes processing as described above. At step 702, the first set of configuration and state information for system/private storage objects is read using the RAID library. At step 704, objects representing system/private storage entities are instantiated whereby such entities contain the second set of configuration and state information for user/client storage objects. The system/private storage objects instantiated may be included in a system object topology (e.g., 441b of FIG. 6A) that interfaces with (e.g., performs calls to) the RAID library for I/O processing. At step 706, the second set of configuration and state information for user/client objects is read. The read is performed using the RAID library and an I/O runtime stack based on the system object topology including system/private objects instantiated in step 704. At step 708, user/client objects representing user/client storage entities are instantiated and then exported. The user/client storage entities contain user/client data. The user/client objects may be included in a client/user object topology that interfaces with (e.g., performs calls to) the RAID library for I/O processing. At step 710, user/client I/Os are processed using the RAID library and an I/O runtime stack based on the user/client object topology including objects instantiated in step 708. It should be noted that steps 702-708 may be performed as part of processing when booting the data storage system. Step 710 may be performed in an ongoing manner subsequent to boot time when processing received I/O requests, such as from hosts or other clients having data stored on the data storage system.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable medium having any one of a variety of different forms including volatile and nonvolatile, removable and non-removable media implemented in any method or technology for storage of information such as computer readable instructions, data structures, program modules or other data. Computer-readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:
1. A method for booting a data storage system comprising:
reading a first set of configuration and state information from a first set of one or more storage devices, said first set of one or more storage devices being included in a first redundant array of independent disks (RAID) group, wherein said reading the first set of configuration and state information includes performing a first set of one or more calls to a first code portion with a first set of one or more parameters including information describing the first RAID group and a first target location of the first set of configuration and state information;
instantiating a first set of system objects using the first set of configuration and state information, the first set of system objects representing physical and logical storage entities including a second set of configuration and state information whereby the first set of system objects are included in a system object topology;
reading, using an I/O runtime stack based on the system object topology, the second set of configuration and state information from a second set of one or more storage devices included in a second RAID group, wherein said reading the second set of configuration and state information includes performing a second set of one or more calls to the first code portion with a second set of one or more parameters including information describing the second RAID group and a second target location of the second set of configuration and state information; and
instantiating a second set of client objects using the second set of configuration and state information, the second set of client objects representing physical and logical entities including client data stored on a third set of one or more storage devices included in a third RAID group, wherein the second set of client objects are included in a client object topology.

2. The method of claim 1, wherein said reading the first set of configuration and state information is performed using a second code portion that issues said first set of one or more calls to the first code portion, wherein the second code portion creates and initializes a first structure included as a first parameter of the first set of parameters.

3. The method of claim 2, wherein the first structure describes a RAID geometry of the first RAID group.

4. The method of claim 3, wherein the first structure includes a list identifying the first set of one or more storage devices as being included in the first RAID group, and a RAID protection level of the first RAID group.

5. The method of claim 2, wherein the second code portion creates and initializes a second structure included as a second parameter of the first set of parameters.

6. The method of claim 5, wherein the second structure describes a first read operation to read the first set of configuration and state information from the first RAID group.

7. The method of claim 6, wherein the second structure includes information that identifies an I/O operation type of read and identifies the first target location.

8. The method of claim 1, wherein said reading the second set of configuration and state information includes a method of a RAID group object in the system object topology performing said second set of one or more calls to the first code portion, wherein said RAID group object represents said second RAID group in the system object topology.

9. The method of claim 8, wherein the RAID group object includes a set of attributes describing the second RAID group, wherein the second set of parameters are specified using the set of attributes from the RAID group object, and wherein a method of the RAID group object receives as one or more input parameters a read I/O operation request to read the second set of configuration and state information at the second target location, said read I/O operation request being received from one or more higher level objects in an object hierarchy including the RAID group object.

10. The method of claim 9, wherein the second set of parameters includes a first structure describing a RAID geometry of the second RAID group.

11. The method of claim 10, wherein the first structure includes a list identifying the second set of one or more storage devices as being included in the second RAID group, and a RAID protection level of the second RAID group.

12. The method of claim 1, further comprising:
receiving a first I/O operation from a client; and
processing the first I/O operation using an I/O runtime stack based on the client object topology, wherein said processing the first I/O operation includes performing a third set of one or more calls to the first code portion with a third set of one or more parameters including information describing the third RAID group and a third target location identifying a location from which data is read or a location to which data is written in accordance with the first I/O operation.

13. The method of claim 12, wherein said processing the first I/O operation includes a method of a RAID group object in the client object topology performing said third set of one or more calls to the first code portion, wherein said RAID group object represents said third RAID group in the client object topology.

14. The method of claim 13, wherein the RAID group object includes a set of attributes describing the third RAID group, wherein the third set of parameters are specified using the set of attributes from the RAID group object, and wherein a method of the RAID group object receives as one or more input parameters an I/O operation request for the third I/O operation, the input parameter identifying a type of the I/O operation request as a read or a write operation and also identifying the location from which data is read or to which data is written in accordance with the type, and wherein the I/O operation request is received from one or more higher level objects in an object hierarchy including the RAID group object.

15. The method of claim 14, wherein the third set of parameters includes a first structure describing a RAID geometry of the third RAID group.

16. The method of claim 15, wherein the first structure includes a list identifying the third set of one or more storage devices as being included in the third RAID group, and a RAID protection level of the third RAID group.

17. A non-transitory computer readable medium comprising code stored thereon for booting a data storage system, the computer readable medium comprising code for:
reading a first set of configuration and state information from a first set of one or more storage devices, said first set of one or more storage devices being included in a first redundant array of independent disks (RAID) group, wherein said reading the first set of configuration and state information includes performing a first set of one or more calls to a first code portion with a first set of one or more parameters including information describing the first RAID group and a first target location of the first set of configuration and state information;
instantiating a first set of system objects using the first set of configuration and state information, the first set of system objects representing physical and logical storage entities including a second set of configuration and state information whereby the first set of system objects are included in a system object topology;
reading, using an I/O runtime stack based on the system object topology, the second set of configuration and state information from a second set of one or more storage devices included in a second RAID group, wherein said reading the second set of configuration and state information includes performing a second set of one or more calls to the first code portion with a second set of one or more parameters including information describing the second RAID group and a second target location of the second set of configuration and state information; and
instantiating a second set of client objects using the second set of configuration and state information, the second set of client objects representing physical and logical entities including client data stored on a third set of one or more storage devices included in a third RAID group, wherein the second set of client objects are included in a client object topology.

18. The non-transitory computer readable medium of claim 17, wherein said reading the first set of configuration and state information is performed using a second code portion that issues said first set of one or more calls to the first code portion, wherein the second code portion creates and initializes a first structure included as a first parameter of the first set of parameters.

19. The non-transitory computer readable medium of claim 18, wherein the first structure describes a RAID geometry of the first RAID group.

20. The non-transitory computer readable medium of claim 19, wherein the first structure includes a list identifying the first set of one or more storage devices as being included in the first RAID group, and a RAID protection level of the first RAID group.

* * * * *